Dec. 11, 1951 W. M. DUNN 2,578,232
TRUCK
Filed Jan. 27, 1948
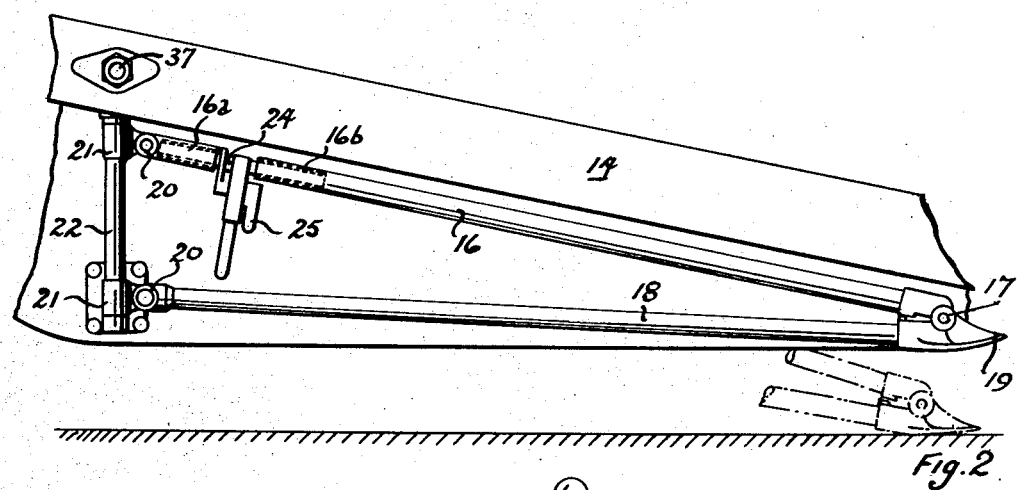
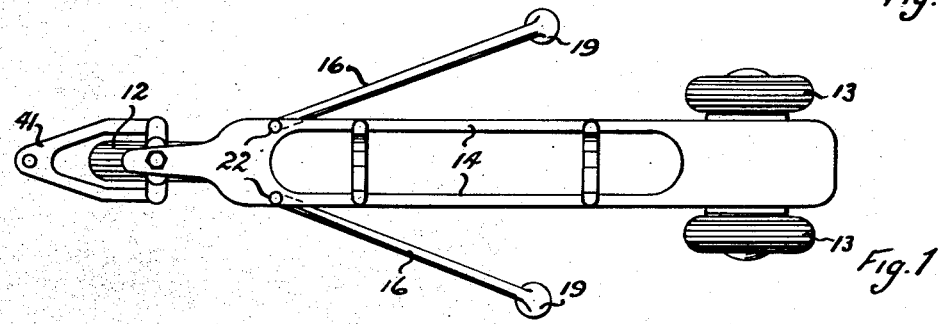
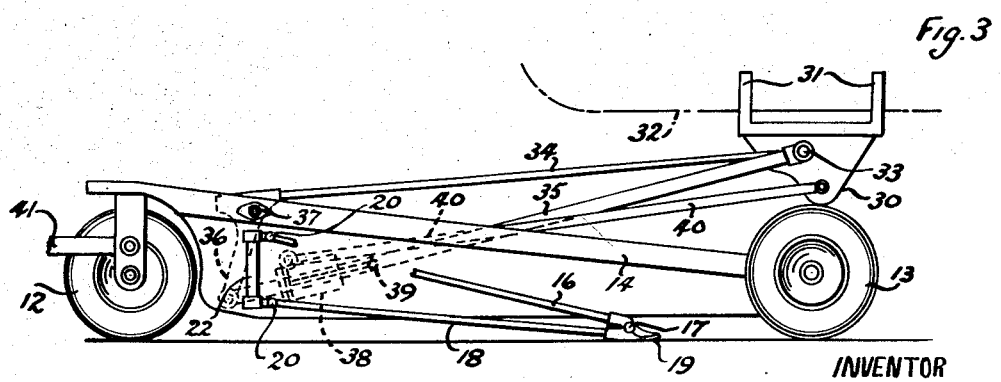
INVENTOR
WILLIAM M. DUNN
By Mawhinney & Mawhinney
ATTYS.

Patented Dec. 11, 1951

2,578,232

UNITED STATES PATENT OFFICE 2,578,232

TRUCK

William M. Dunn, Coventry, England, assignor to Alvis Limited, Coventry, England Application January 27, 1948, Serial No. 4,689
In Great Britain March 29, 1947

1 Claim. (Cl. 212—145)

This invention relates to a truck for supporting a bomb, torpedo or other load, the truck having a hoisting mechanism for raising the load (so that it can be taken aboard an aircraft or to some other position above the ground).

My main object is to provide a satisfactory form of relatively narrow truck, as aforesaid, for use on an aircraft carrier.

The invention broadly consists in a truck, with a proportionately narrow wheel track, having a hoisting mechanism as aforesaid, in combination with means for steadying the truck, the steadying means comprising, on each side of the truck, an upper and a lower arm pivoted together at one end for movement about a substantially horizontal axis and independently pivotally connected to the truck at the other ends for movement about substantially horizontal axes, means for swinging the arms as a whole about a substantially vertical axis at the said other ends, and means for varying the length of one of the arms with reference to the other so as to move the ends, at which the arms are pivoted together, relatively to the ground. Conveniently the adjustable arm comprises aligned portions having screw-threaded engagements with threads of opposite hand on an aligned connector (such as a spindle or tube) which can be rotated to adjust the length of the arm. The rotation of the connector may be effected by means of a racking device.

In the accompanying drawings:

Figure 1 is a rather diagrammatic plan of a truck, fitted with steadying means (shown in one operative position), according to the invention;

Figure 2 is an elevation of the steadying means to a larger scale, the operative position of the ground-engaging end being shown in chain lines, and, Figure 3 is a view similar to Figure 2 but also showing the relative positions of the steadying means and the hoisting mechanism.

No hoisting mechanism is actually shown in Figure 1, but it will be understood that any suitable form of hoisting mechanism may be incorporated in the truck. In particular the hoisting mechanism may, as shown by Figure 3, comprise a support 30 (shown as having cradles 31 for a bomb, torpedo, or the like 32) pivotally connected at 33 by a pair of rods 34, 35 to opposite ends of a lever 36 which is itself pivoted to the truck frame at 37. An hydraulic cylinder 38, which is pivotally supported from the truck frame, has its piston rod pivoted at 39 to the rod 35. Thus extension of the piston rod moves the lever 36 counter-clockwise and raises the support 30, the latter being maintained level by a link 40 pivoted to it and to the truck frame. Furthermore, the truck may be provided with an actuating handle 41.

The truck shown has a single, steerable wheel 12 at one end and a pair of wheels 13 at the other end, all these wheels being fitted with pneumatic tires. The chassis-frame, indicated at 14, is, it will be observed, relatively narrow compared with its length and, in consequence, the truck can be manoeuvred in a simple manner on an aircraft carrier or in any other confined space when loaded up with a bomb, torpedo or the like. Such a truck, however, would tend to be insufficiently stable, particularly on an aircraft carrier, when the hoisting mechanism was operated to raise the load, and to overcome this difficulty I provide steadying means on each side.

Each of the steadying means consists of an upper arm 16 pivotally connected at 17 to a lower arm 18 for movement about a substantially horizontal axis, the arms being adapted at their pivoted ends to form a shoe 19. At the other ends the arms are pivoted at 20, 20, for movement about substantially horizontal axes, to brackets 21, 21 which are axially located and rotatably mounted upon a substantially vertical shaft 22 carried by the chassis-frame.

In the present instance the upper arm 16 is arranged so that it can be extended or contracted. Thus, it comprises two aligned portions 16a, 16b having screw-threaded engagements with threads of opposite hand on a spindle 24 which can be rotated in either direction. A two-way-acting racking device for rotating the spindle is indicated diagrammatically at 25.

Figure 2 shows the steadying means in its raised position in which it lies beneath the chassis-frame 14 out of the way, and the truck can then be manoeuvred to a desired spot. When the truck is in position, and before the load is raised, the pairs of arms are swung laterally about the axes of the shafts 22, for example, until they are substantially at right angles to the chassis-frame, Figure 1 showing them when they have been swung laterally to only a small extent; whereupon each of the racking devices 25 is actuated in a direction to extend the upper arm 16 thereby lowering the shoe 19 on to the ground. The truck is then supported at five widely-spaced points and will be very stable while the load is being and is raised. When the load has been removed and the hoisting mechanism operated in the lowering direction the racking devices are actuated in the opposite direction to contract the upper arms 16 and raise the shoes 19, whereupon each of the pairs of arms can be swung back to its normal inoperative position beneath the chassis-frame. A spring or other clamp may be provided for holding the pairs of arms in their inoperative positions.

What I claim as my invention and desire to secure by Letters Patent of the United States is:

A relatively narrow truck for supporting a bomb, torpedo or other load, having a hoisting mechanism pivoted on a transverse axis to the truck for raising the load, means for steadying the truck comprising, on each side, an upper and a lower arm pivoted together at one end for movement about a substantially horizontal axis and independently pivotally connected to the truck at the other ends for movement about substantially horizontal axes, means for swinging the arms as a whole about a substantially vertical axis at the said other ends, between a stowed position beneath the truck frame to a laterally extended operative position, said vertical axis being adjacent the hoisting mechanism pivot axis, the upper arm being of two aligned portions having screw-threaded engagements with threads of opposite hand on an aligned connector, a racking device for rotating the connector for adjusting the length of the said upper arm with reference to said lower arm so as to move the ends, at which the arms are pivoted together, relatively to the ground, and a downwardly convexly curved ground-engaging shoe at the end of the lower arm which is pivoted to the upper arm.

WILLIAM M. DUNN.

REFERENCES CITED

The following references are of record in the file of this patent:

UNITED STATES PATENTS

| Number | Name | Date |
|---|---|---|
| 802,925 | Ferris | Oct. 24, 1905 |
| 882,086 | Webber, Jr. | Mar. 17, 1908 |
| 2,375,264 | Wagner et al. | May 8, 1945 |